May 10, 1949.  W. E. PARISH  2,469,570
ADJUSTABLE ACTUATING MEMBER
Filed Sept. 29, 1947
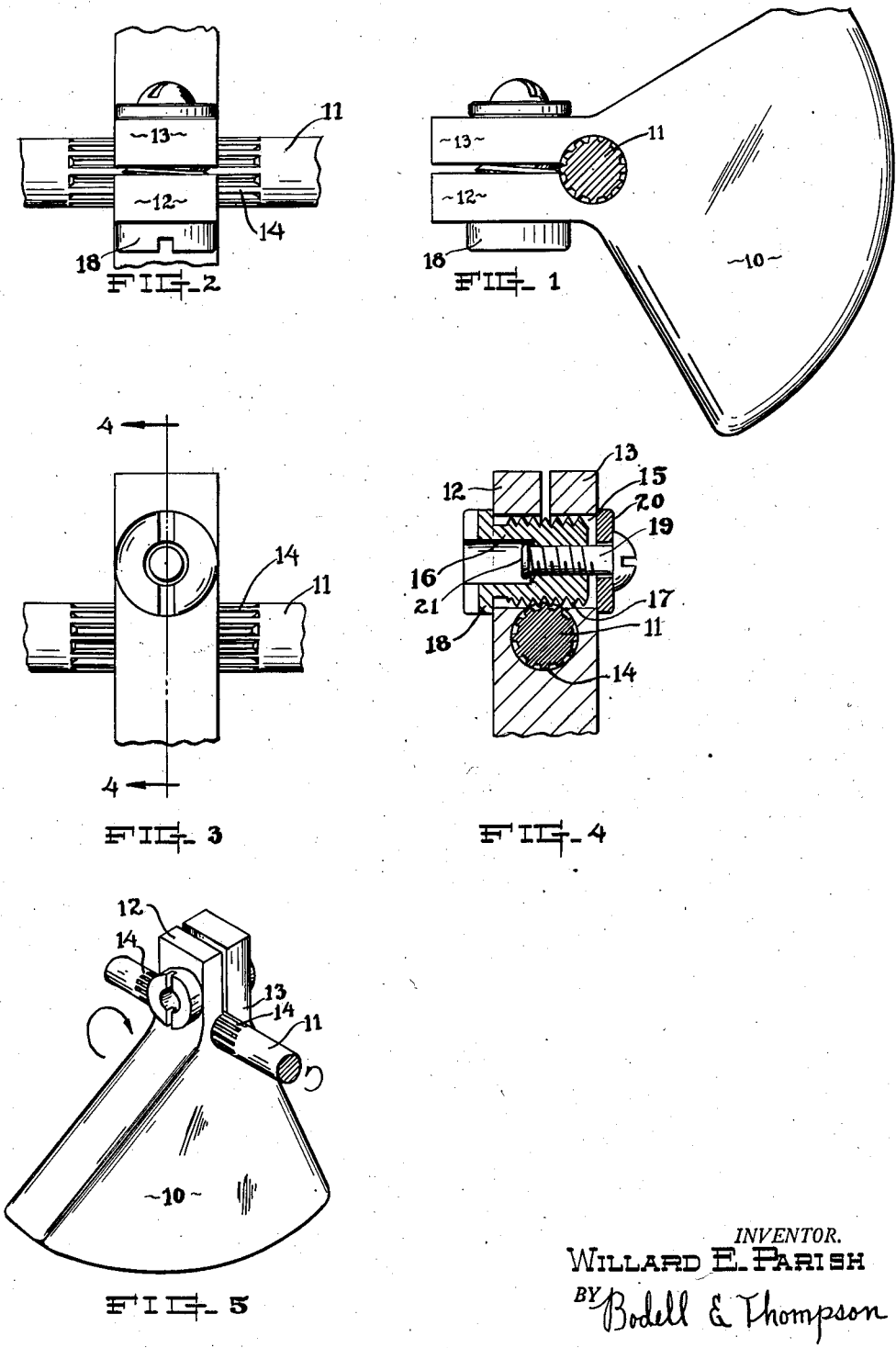
INVENTOR.
WILLARD E. PARISH
BY Bodell & Thompson
ATTORNEYS Patented May 10, 1949

2,469,570

UNITED STATES PATENT OFFICE 2,469,570

ADJUSTABLE ACTUATING MEMBER

Willard E. Parish, Syracuse, N. Y., assignor to Crouse-Hinds Company, Syracuse, N. Y., a corporation of New York Application September 29, 1947, Serial No. 776,731

1 Claim. (Cl. 287—52.08)

This invention relates to an adjustable actuating member, for example a cam carried on a shaft.

The invention has as an object a novel structure by which relative rotation between the actuating member and the shaft can be quickly and conveniently effected, the adjustment being in the nature of a precision adjustment, and the structure also embodying means whereby the actuating member can be fixedly clamped to the shaft.

The invention consists in the novel features and in the combinations and constructions hereinafter set forth and claimed.

In describing this invention, reference is had to the accompanying drawings in which like characters designate corresponding parts in all the views.

Figure 1 is a side elevational view of a structure embodying my invention.

Figure 2 is an elevational view looking to the right, Figure 1.

Figure 3 is an elevational view looking upwardly in Figures 1 and 2.

Figure 4 is a view taken on line 4—4, Figure 3.

Figure 5 is a perspective view of the structure.

The actuating member is shown in the nature of a cam 10 formed with a bore to receive a shaft 11 and having a portion extending radially from the opposite side of the shaft, this portion being preferably split to form legs 12, 13.

The shaft is formed with circumferentially spaced teeth 14, and the leg portions 12, 13, of the hub are formed with a bore 15 in which is rotatably mounted a screw 16. This bore extends transversely across the shaft, and the arrangement is such that the threaded portion 17 of the screw engages the teeth 14. With this arrangement, rotation of the screw 16 effects relative rotation between the actuating member and the shaft 11.

The screw 16 is held from axial movement in one direction by an enlarged head portion 18 engaging the actuating member at one end of the bore 15. The opposite end of the screw is threaded to receive a clamping screw 19 carrying a washer 20 engaging the opposite side of the actuating member. The inner end of the screw 19 is preferably swedged over, as at 21, to prevent its detachment, or removal, from the adjusting screw 16. The bead 21 also limits withdrawal of screw 19 from screw 16 and thereby limits the end play of screw 16 during the adjustment of cam 10.

The screw 19, when tightened, serves to clamp or lock the screw 16 from rotation, as will be apparent, and it also compresses the leg portions 12, 13, together, clamping the hub portion of the actuating member on the shaft to hold the same from axial movement on the shaft.

With this structure, a cam, or similar element, can be conveniently adjusted on its carrying shaft and, because of the worm gear arrangement, the adjustment can be made with considerable precision.

What I claim is:

A shaft, an actuating member carried thereon, a screw rotatably mounted in the actuating member, said shaft being formed with a plurality of circumferentially spaced apart teeth, said screw being cooperable with said teeth upon rotation to effect relative rotation between the shaft and the actuating member, a second screw having threaded engagement with said first screw and being cooperable therewith and with said actuating member to clamp said first screw against rotation.

WILLARD E. PARISH.

REFERENCES CITED

The following references are of record in the file of this patent:

UNITED STATES PATENTS

| Number | Name | Date |
|---|---|---|
| 642,710 | Palmer | Feb. 6, 1900 |
| 866,184 | Brison | Sept. 17, 1907 |
| 1,421,408 | Collyer | July 4, 1922 |
| 1,623,262 | Nelson | Apr. 5, 1927 |
| 1,663,290 | Bendix | Mar. 20, 1928 |